March 22, 1960  H. J. MACKWAY  2,929,258
JOYSTICK CONTROL MECHANISM
Filed Sept. 18, 1957  2 Sheets-Sheet 2
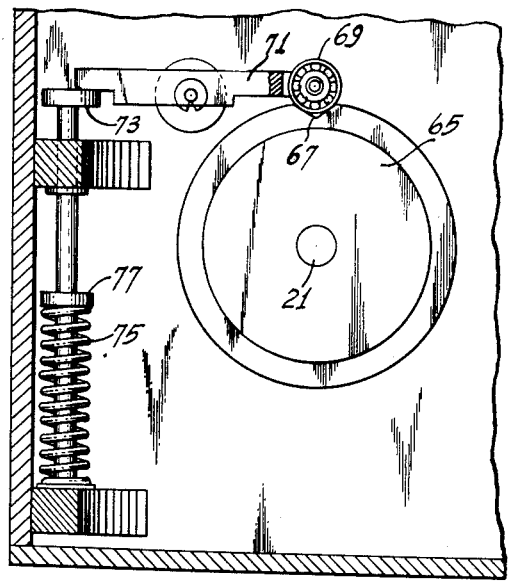
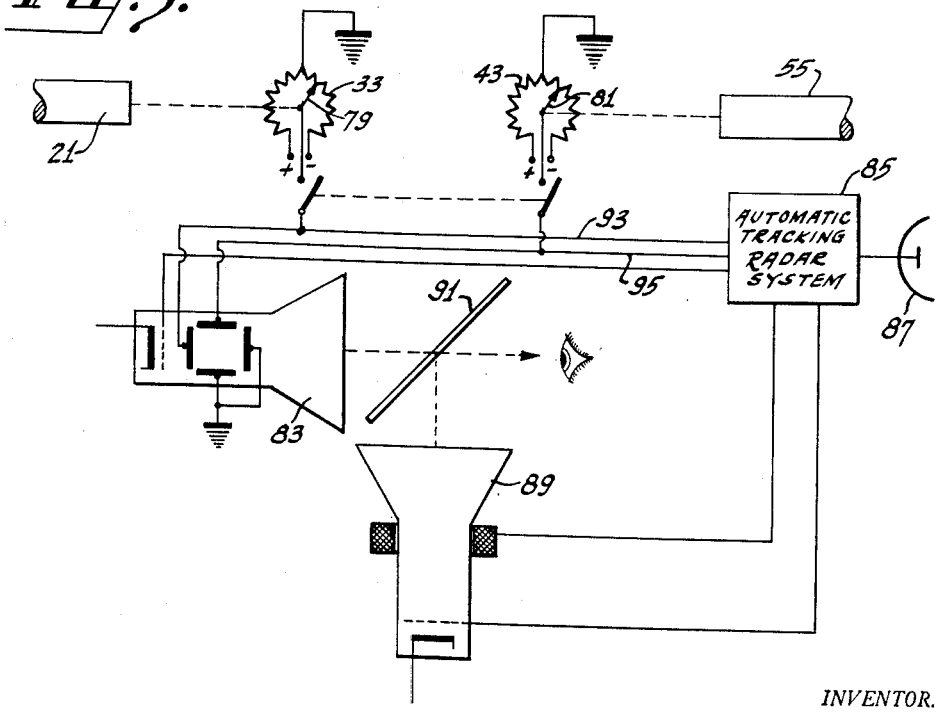
INVENTOR.
HAROLD J. MACKWAY

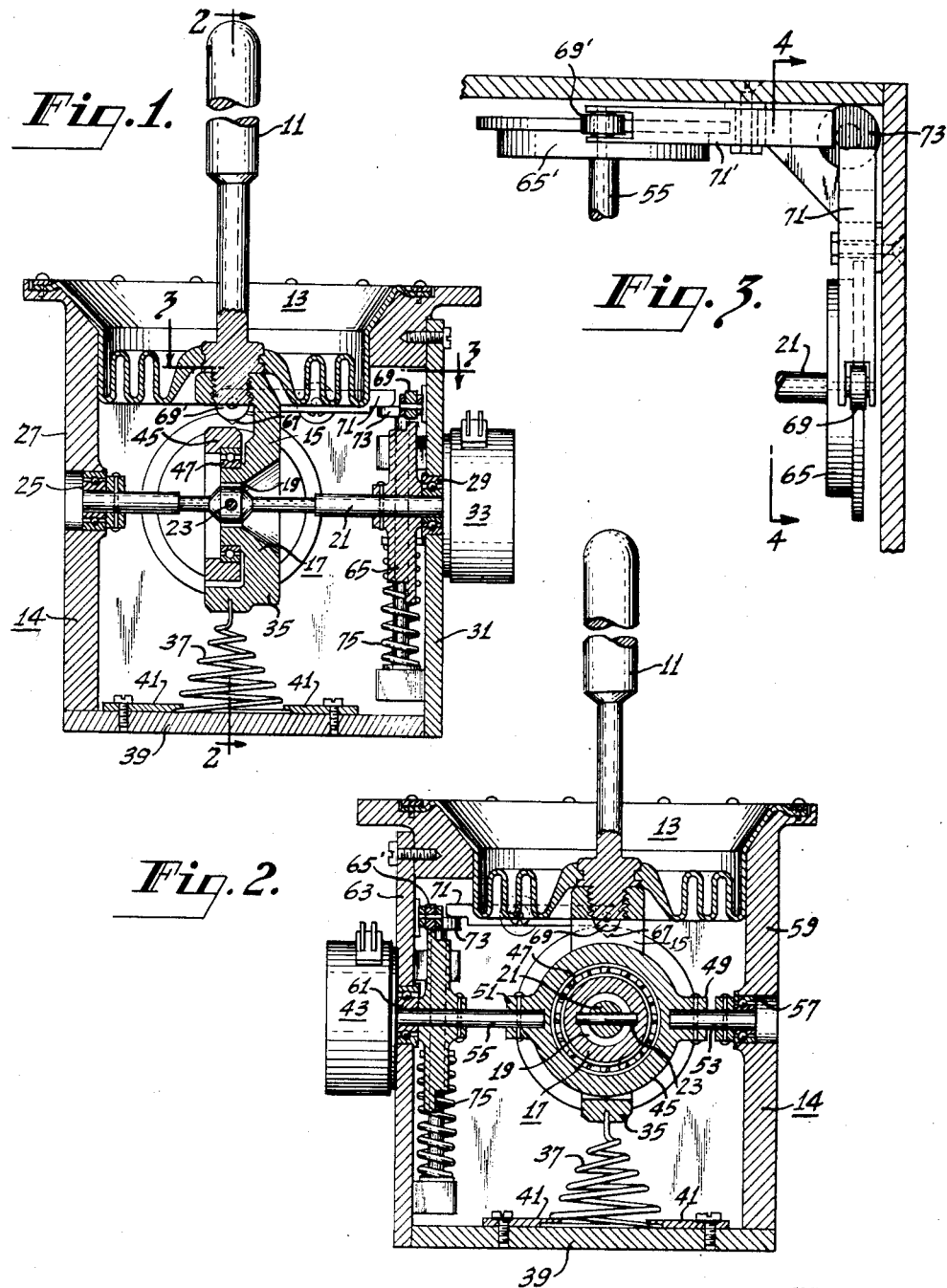

United States Patent Office 2,929,258
Patented Mar. 22, 1960

2,929,258

JOYSTICK CONTROL MECHANISM

Harold J. Mackway, Haddon Heights, N.J., assignor, by mesne assignments, to the United States of America as represented by the Secretary of the Navy Application September 18, 1957, Serial No. 684,826

2 Claims. (Cl. 74—471)

This invention relates to an improved mechanical movement of the joystick type—a mechanism wherein the movement of one member is translated into corresponding movement of one or more other members. The invention finds particular use in radar systems wherein displacement of a joystick is converted into electrical signals which in turn are used, for example, for strobe indications or to position a radar antenna.

One specific use of a joystick control is in automatic tracking radar systems which provide information in rectangular Cartesian co-ordinates as to the position of one or more targets. The rectangular information is in the form $x$, $y$, designating the co-ordinates of the target in a horizontal plane relative to the radar system. Information provided by the radar system is usually displayed on the screen of a cathode ray tube. Echo signals from a target are detected by the receiver of the system and are used to modulate the cathode ray to provide an intense spot or marker on the screen. The spot is deflected by appropriate voltages applied to the deflecting means of the cathode ray tube to properly locate the spot on the screen. The output voltage from the joystick mechanism may be applied to the deflecting means of the cathode ray tube to deflect another marker or strobe until it is superimposed over or in the same relative position as the spot which represents a target echo. When this occurs, the output voltage of the joystick control is indicative of the co-ordinates of the selected target and may be applied to automatic tracking circuits or the like for locking a radar antenna on the target.

When a joystick control is employed in this manner it is desirable that the force required to move the joystick shall be uniform or that it shall uniformly increase as the joystick is moved away from its center position. It is also desirable that the joystick shall be automatically and accurately returned to its center position to prevent false representation of co-ordinates $x$, $y$, from being generated when the joystick is not being employed.

Accordingly, a general object of this invention is to provide a mechanical movement of the type described which has improved performance characteristics over presently known similar movements.

Another object of this invention is to provide a mechanical movement of the type described wherein the force required to move the joystick control shall increase as the control is moved away from its center position.

Yet another object of this invention is to provide an improved mechanical movement of the type described wherein return of the joystick to a center position is accurately and automatically obtained.

This invention accomplishes these objects by providing an improved mechanical movement wherein force is applied to a first member causing it to move from a reference position to other positions. The movement of the first member is translated into corresponding rotational movements of second and third members which are mechanically coupled to the first member. Mechanical biasing means is provided to constantly urge the first member toward its reference position. This biasing means may be, for example, a bias spring attached to the first member in a manner such that it produces a counter force proportional to the extent of movement of the member away from its reference position. Additional biasing means is provided which supplements the function of the first biasing means. This additional means acts directly on the rotational movement of the second and third members and hence, through the mechanical coupling between these members and the first member, acts to accurately return the first member to its reference position when the initial applied force is removed. In the embodiment to be described the additional biasing means comprises, for example, a pair of cam and pawl arrangements, each associated with one of the second and third members. Each cam has an indentation in its periphery with which its associated pawl engages when the first member is located at its reference position.

Other objects and many of the attendant advantages of this invention will be described in greater detail by reference to the accompanying drawings wherein:

Fig. 1 is a cross-sectional view taken through the center of a joystick control made in accordance with this invention;

Fig. 2 is a second cross-sectional view taken perpendicular to and along the line 2—2 of the view of Fig. 1;

Fig. 3 is a plan view of the complete cam and pawl assembly forming a part of the joystick control and viewed in the direction 3—3 of Fig. 1;

Fig. 4 is a front elevation of one of the cam and pawl arrangements of Fig. 3 and viewed in the direction 4—4 of Fig. 3; and Fig. 5 is a schematic diagram illustrating the utility of this invention in a radar system.

Similar reference characters are applied to similar elements throughout the drawings.

Referring now to Figs. 1 and 2, a control member or joystick 11 is shown extending upward through a flexible dust cover 13 in the top of a suitable support housing 14. At its lower end the joystick 11 is threaded into an upwardly extending arm 15 of a gimbal device 17. The main body of the gimbal device 17 has a round aperture 19 through which a rotatable shaft 21 extends. The gimbal device 17 and the shaft 21 are locked together by means of a pin 23 passing through the shaft 21 and having its ends seated in the main body of the gimbal device 17. The pin 23 does not fit tightly into its seat in the gimbal device 17 but rather fits loosely enough to permit movement of the gimbal device 17 in a plane normal to the axis of the pin 23. Sufficient clearance is provided in the aperture 19 to permit rotation of the gimbal device 17 through an angle of about 70 degrees in the plane of Fig. 1. One end of the shaft 21 is supported in a ball-bearing race 25 in one wall 27 of the housing while the opposite end passes through and is supported by a second ball-bearing race 29 in the opposite wall 31 of the housing. Attached to the exterior of this wall 31 is a variable resistor 33 which has a wiper arm mechanically coupled to the shaft 21. Since resistors of this type are well known, details have been omitted and the operation will be described in connection with the description of Fig. 5. Attached to a downwardly projecting arm 35 of the gimbal device 17 is a conical spring 37. The base of the conical spring 37 is secured to the floor 39 of the housing by four clamps 41.

Movement of the joystick 11 into or out of the plane of Fig. 1 will produce a corresponding rotational movement of the shaft 21 and hence of the wiper arm of the variable resistor 33. If the joystick 11 is moved in a direction parallel to the plane of Fig. 1 the shaft 21 will not experience any rotational movement. Whenever the joystick 11 is moved away from a central vertical position the conical spring 37 is extended. The tension of the spring 37 will vary directly with the extent of movement of the joystick 11 away from its vertical position. Thus, it can be seen, the conical spring 37 will always exert a force tending to return the joystick 11 to the vertical position and this force will continuously increase as the joystick 11 is moved away from vertical.

To provide for translation of movement of the joystick 11 into rotational movement of the wiper arm of a second variable resistor 43, Fig. 2, a second gimbal arrangement is provided. This comprises a circular ring 45 which is coupled to the main body of the first gimbal device 17 by means of a ball-bearing race 47. The ring is equipped with two ears 49 and 51 into which the ends of two cylindrical rods 53 and 55 are inserted. The opposite end of one of the rods 53 is supported in a ball-bearing race 57 in a third wall 59 of the housing 14. The opposite end of the other rod 55 extends through and is supported by a ball-bearing race 61 in the fourth wall 63 of the housing 14. This latter rod is coupled to the wiper arm of the second variable resistor 43. As before, this resistor is of a well known type and its operation will be discussed in the description of Fig. 5.

With a second gimbal arrangement as described, any movement of the joystick 11 parallel to the plane of Fig. 2 will not be felt by the ring 45 and hence will not cause any rotation of the rods 53 and 55. When the joystick 11 is moved into or out of the plane of Fig. 2, such movement will be transmitted to the ring 45 through the ball-bearing race 47 to produce a corresponding rotation of the rods 53, 55 and hence of the wiper arm of the variable resistor 43.

In the construction of a joystick control, in accordance with this invention, it is desirable that the axis of the shaft 21 and the common axis of the rods 53 and 55 intersect at a common point. It is also desirable that the joystick 11 pivot about a fulcrum which is coincident with the common point. The point at which the apex of the conical spring is attached to the downwardly projecting arm 35 of the gimbal device 17 should lie along the axis of the joystick 11.

By means of a joystick control as thus far described movement of the joystick 11 can be translated into rotational movements of the wiper arms of the variable resistors 33 and 43. Electrical signals can then be obtained from the variable resistors which represent the x and y co-ordinates of the position of the joystick at any particular moment. The production and utilization of these signals will be further discussed in connection with Fig. 5.

An important additional feature of this invention comprises the provision of a pawl and cam mechanism for accurately and automatically returning the joystick 11 to its central vertical position when it is released. This mechanism is shown in detail in Figs. 3 and 4. In Fig. 4 a cam wheel 65 is shown mounted on the shaft 21. (This cam wheel mounting is also shown in cross-section in Fig. 1). The periphery of the cam has a V-shaped indentation 67 therein. A pawl wheel 69 carried on one end of a lever arm 71 is positioned adjacent to the cam so that the pawl wheel 69 rides on the periphery of the cam 65. At the other end of the lever arm 71 there is provided a spring actuated plunger 73. The spring 75 is of the compression type bearing against a shoulder 77 on the plunger. The force of the spring causes the plunger 73 to be urged upward against the end of the lever 71 which in turn urges the pawl wheel 69 into contact with the periphery of the cam 65. An identical cam 65' is mounted on the cylindrical rod 55. (This cam mounting is also shown in cross-section in Fig. 2). An identical lever 71' and pawl wheel 69' arrangement is provided and this pawl wheel 69' is urged against its cam 65' by the same spring actuated plunger 73. The V-shaped indentation in the periphery of each of the cams 65 and 65' is located on the periphery such that when each pawl wheel is seated in its associated indentation, the joystick will be in its central vertical position.

At any time when the joystick 11 is released the conical spring 37 will urge it back to its vertical position. However, as the joystick 11 nears this position, the strength of the spring 37 approaches zero. Thus, the joystick 11 could frequently pass through the position and, at times, oscillate for a short time. Should this happen, a false signal will be produced by one or both of the variable resistors 33 and 43. This action is prevented by the pawl and cam arrangements. As the joystick nears its vertical position, either or both of the pawl wheels 69, 69' will roll over the shoulder of the V-shaped notch. When this happens, an additional force will be applied to return the joystick 11 to the vertical and when both pawl wheels come to rest in their respective notches the joystick 11 will be accurately centered in the vertical position.

In Fig. 5 is shown in brief form a circuit which may be used to derive from the rotation of the shaft 21 and the cylindrical rod 55 electrical signals in Cartesian co-ordinate form. The shaft 21 is mechanically coupled to the wiper arm 79 of the variable resistor 33. In a similar manner the rod 55 is coupled to the wiper arm 81 of the resistor 43.

The resistors 33 and 43 are both grounded at their centers and are supplied with a D.C. voltage applied across their respective ends. When the joystick is centered in its vertical position, each of the wiper arms 79 and 81 will be located at the ground potential point of its respective resistor. Thus, the output voltages of the resistors will be $x=0$, $y=0$. When the joystick is displaced from its center position, the shaft 21 and/or the rod 55 rotate to move the wiper arms 33 and 43 from their 0 voltage positions to positions indicative of the displacement of the joystick in the $x$ and $y$ directions.

The $x$ and $y$ voltages may be employed to deflect the beam of a cathode ray tube 83. Target signals received by an automatic tracking radar system 85 (shown as a single block) are applied to the control grid of a second cathode ray tube 89 to intensity modulate the beam of that tube. Deflection circuits in the automatic tracking system 85 maintain the beam of the second tube 89 normally centered on the screen.

A dichroic mirror 91 is positioned to transmit light from the screen of the first cathode ray tube 83 to the eye and to reflect light from the screen of the second tube 89 to the eye. If it is desired to track a target appearing on the screen of the second tube 89, the joystick is moved until the $x$ and $y$ deflecting voltages from the variable resistors 33 and 43 deflect the intense spot on the screen of the first tube to a position such that it appears to the eye superimposed over the target image from the second tube 89. The $x$ and $y$ voltages are also applied over leads 93 and 95 through switches in the automatic tracking system 85 to store circuits in that system. The system thereafter takes over and automatically continues to track the target.

Obviously many modifications and variations of the present invention are possible in the light of the above teachings. It is therefore to be understood that within the scope of the appended claims the invention may be practiced otherwise than is specifically described.

What is claimed is:

1. A mechanical movement comprising a supporting structure; a pair of mutually perpendicular shaft members rotatably mounted in said supporting structure, the axes of said shaft members intersecting at a common point, an extending member movable about a fulcrum coinciding with said common point, a gimbal mechanism coupling said pair of shaft members to said extending member for translating the extent and direction of movement of said extending member into corresponding rotational movement of the respective shaft members, a bias spring coupled to said extending member for urging said member to a predetermined reference position with respect to said mutually perpendicular shaft members, a pair of cams carried by one of each of said pair of shaft members, each of said cams having an indentation formed therein, a pair of pawls pivotally mounted on said supporting structure for cooperation with one of each of said pair of cams, a pair of pawl wheels carried by one of each of said pair of pawls and normally in engagement with its respective indentation, and a spring biased plunger slidably mounted on said supporting structure in engagement with said pair of pawls forcibly urging and maintaining each of said pawl wheels in engagement with its respective indentation to automatically lock and accurately return said extending member to said reference position when not in use.

2. An electromechanical apparatus comprising: a support housing; a pair of mutually perpendicular shaft members mounted within said housing, the axes of said shaft members intersecting at a common point, one end of each of said shaft members extending through a respective wall of said housing; a pair of variable resistors mounted externally on said housing one adjacent to each of said extending ends of said shaft members; each resistor having a center tap for applying thereto a reference potential and having a wiper arm coupled to a respective one of said shaft members for producing an electrical signal corresponding in sense and magnitude to the direction and extent of rotation of the respective shaft member; a control handle; a first coupling between said control handle and one of said pair of shaft members, said coupling comprising a ringlike portion surrounding said shaft member and connected to said shaft member by a pin therethrough, the axis of said pin passing through said common point of intersection normal to the axis of said shaft member, said first coupling having an upwardly extending arm to which said control handle is rigidly fixed in a manner such that said control arm is movable about a fulcrum coinciding with said common point of intersection, said first coupling also having a downwardly extending arm to which the apex end of a conical spring is affixed at a point coaxial with said control arm, the other end of said conical spring being rigidly mounted in said housing; a second coupling between said first coupling and the other of said shaft members, said second coupling comprising an abbreviated right circular cylinder surrounding and coaxial with the ringlike portion of said first coupling and a ball-bearing race between said cylinder and said ringlike portion, said other shaft member comprising two coaxial shaft portions each of which is rigidly fastened at its inner end to said cylinder; a pair of generally circular cams each mounted within said structure on one end of a respective shaft member; a lever arm adjacent each said cam; a pawl wheel rotatably mounted on one end of each of said level arms so as to contact the periphery of its associated cam; a single spring actuated piston bearing against the other end of each lever arm to urge each said pawl wheel into contact with its associated cam; each said cam having an indentation in the periphery thereof so located as to be engaged by its associated pawl wheel when the wiper arm of the associated variable resistor is at the center tap position.

References Cited in the file of this patent

UNITED STATES PATENTS

| | | |
|---|---|---|
| 561,777 | Essberger et al. | June 9, 1896 |
| 1,249,755 | Holmgren | Dec. 11, 1917 |
| 1,590,817 | Tillettaz | June 29, 1926 |
| 1,829,037 | Bobroff | Oct. 27, 1931 |
| 2,078,663 | Hafner | Apr. 27, 1937 |
| 2,379,778 | Allen | July 3, 1945 |
| 2,396,309 | Wodal | Mar. 12, 1946 |
| 2,407,840 | Leonard | Sept. 17, 1946 |
| 2,455,963 | Wheeler | Dec. 14, 1948 |
| 2,507,451 | Molnar et al. | May 9, 1950 |
| 2,595,282 | Monchablon | May 6, 1952 |
| 2,700,904 | Woods | Feb. 1, 1955 |
| 2,747,035 | Hansen et al. | May 22, 1956 |

FOREIGN PATENTS

| | | |
|---|---|---|
| 764,724 | Germany | Sept. 22, 1952 |